United States Patent
Salfity et al.

(10) Patent No.: US 11,562,524 B2
(45) Date of Patent: Jan. 24, 2023

(54) MOBILE ROBOTS TO GENERATE OCCUPANCY MAPS

(71) Applicant: Hewlett-Packard Development Company, L.P., Spring, TX (US)

(72) Inventors: Jonathan Salfity, Palo Alto, CA (US); David Murphy, Palo Alto, CA (US); Will Allen, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 98 days.

(21) Appl. No.: 16/755,629

(22) PCT Filed: Oct. 31, 2017

(86) PCT No.: PCT/US2017/059391
§ 371 (c)(1),
(2) Date: Apr. 13, 2020

(87) PCT Pub. No.: WO2019/089017
PCT Pub. Date: May 9, 2019

(65) Prior Publication Data
US 2020/0334887 A1    Oct. 22, 2020

(51) Int. Cl.
*G06T 15/00* (2011.01)
*G05D 1/02* (2020.01)
(Continued)

(52) U.S. Cl.
CPC .......... *G06T 15/00* (2013.01); *G05D 1/0248* (2013.01); *G05D 1/0251* (2013.01); *G06K 9/628* (2013.01);
(Continued)

(58) Field of Classification Search
CPC .......... G06T 15/00; G06T 2207/10021; G06T 2207/10024; G06T 2207/10028;
(Continued)

(56) References Cited

U.S. PATENT DOCUMENTS

| 8,401,783 B2 | 3/2013 | Hyung et al. |
| 8,787,614 B2 | 7/2014 | Choi et al. |

(Continued)

FOREIGN PATENT DOCUMENTS

| CN | 201573208 | 9/2010 |
| CN | 103901884 | 7/2014 |

(Continued)

OTHER PUBLICATIONS

Günther, Martin et al. "Building semantic object maps from sparse and noisy 3d data." In 2013 IEEE/RSJ International Conference on Intelligent Robots and Systems, pp. 2228-223.

*Primary Examiner* — Sing-Wai Wu

(57) ABSTRACT

An example control system includes a memory and at least one processor to obtain image data from a given region and perform image analysis on the image data to detect a set of objects in the given region. For each object of the set, the example control system may classify each object as being one of multiple predefined classifications of object permanency, including (i) a fixed classification, (ii) a static and fixed classification, and/or (iii) a dynamic classification. The control system may generate at least a first layer of a occupancy map for the given region that depicts each detected object that is of the static and fixed classification and excluding each detected object that is either of the static and unfixed classification or of the dynamic classification.

11 Claims, 6 Drawing Sheets

(51) Int. Cl.
   *G06K 9/62* (2022.01)
   *G06T 7/70* (2017.01)
   *G06V 20/10* (2022.01)
   *G01C 21/00* (2006.01)
   *G06T 7/73* (2017.01)
   *G06V 30/262* (2022.01)

(52) U.S. Cl.
   CPC ........... *G06T 7/70* (2017.01); *G06V 20/10* (2022.01); *G06V 30/274* (2022.01)

(58) Field of Classification Search
   CPC ... G06T 2207/30248; G06T 7/70; G06T 7/74; G06T 7/75; G01C 21/206; G01C 21/3807; G01C 21/387; G06K 9/00664; G06K 9/628; G06K 9/726; G05D 1/0248; G05D 1/0251; G05D 1/0274; G05D 1/0246
   See application file for complete search history.

(56) References Cited

U.S. PATENT DOCUMENTS

| | | |
|---|---|---|
| 9,058,521 B2 | 6/2015 | Yoon et al. |
| 2007/0198129 A1 | 8/2007 | Koselka et al. |
| 2015/0073646 A1 | 3/2015 | Rosenstein et al. |
| 2017/0225321 A1 | 8/2017 | Deyle et al. |

FOREIGN PATENT DOCUMENTS

| | | |
|---|---|---|
| CN | 106959691 | 7/2017 |
| JP | 2014203429 | 10/2014 |

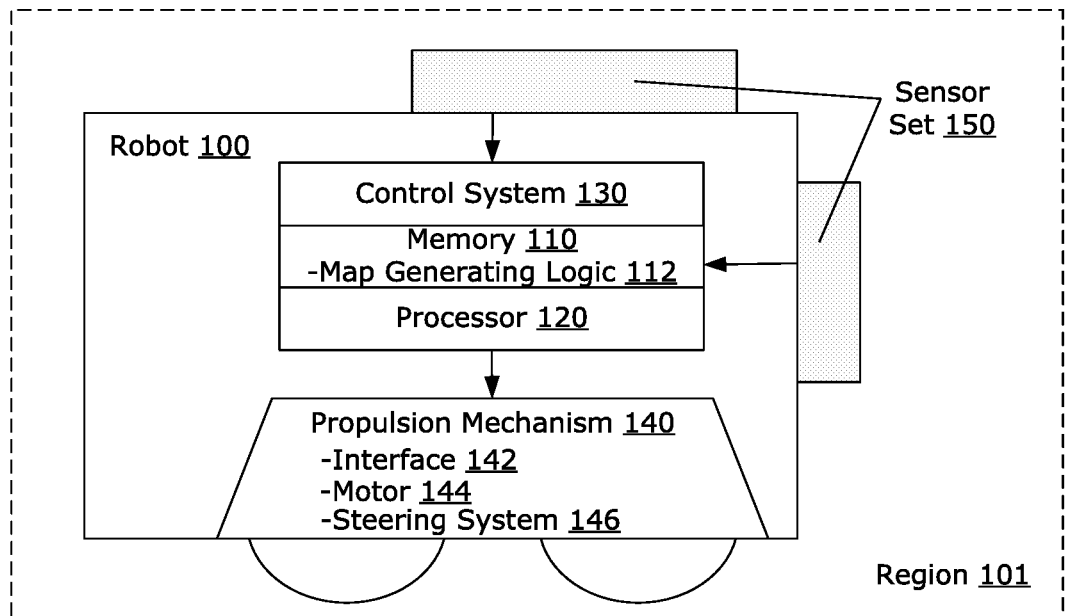
FIG. 1A
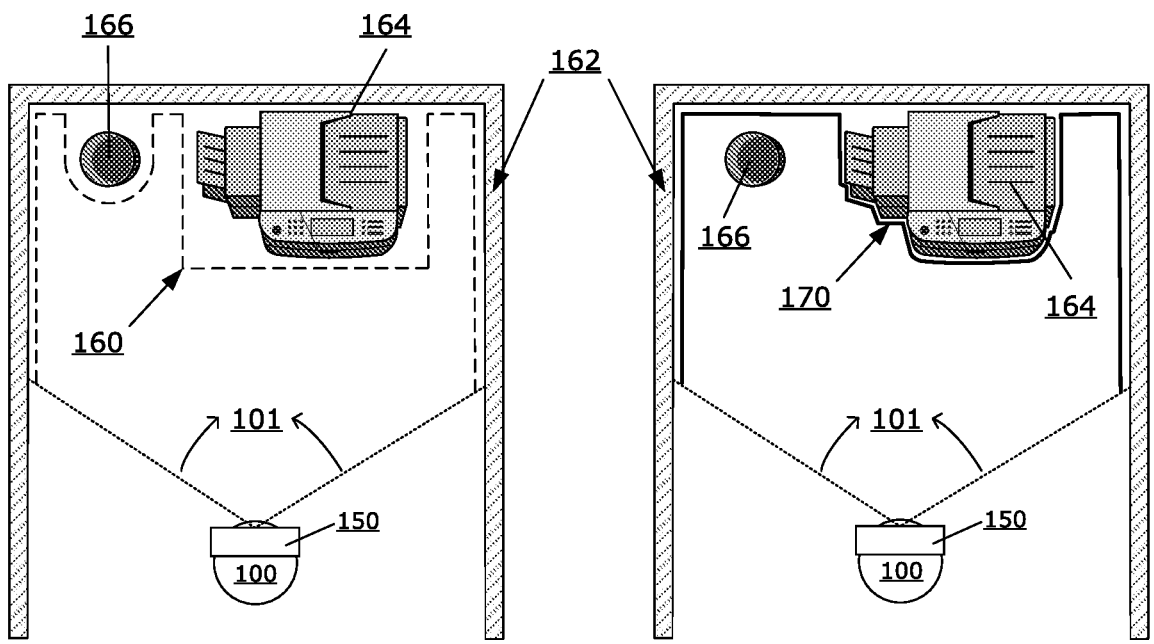
FIG. 1B  FIG. 1C

MOBILE ROBOTS TO GENERATE OCCUPANCY MAPS

BACKGROUND

Mobile robots often utilize occupancy maps for a given region of their respective operation. Many robots construct their own occupancy map while operating, using sensors such as cameras. In the course of traversing a given region, mobile robots often detect objects that adversely affect the accuracy of the constructed map.

BRIEF DESCRIPTION OF THE DRAWINGS

FIG. 1A illustrates an example robot for generating a map of a given region.

FIG. 1B through FIG. 1G illustrate examples of a robot generating layers for an occupancy map.

DETAILED DESCRIPTION

Figure 1D:
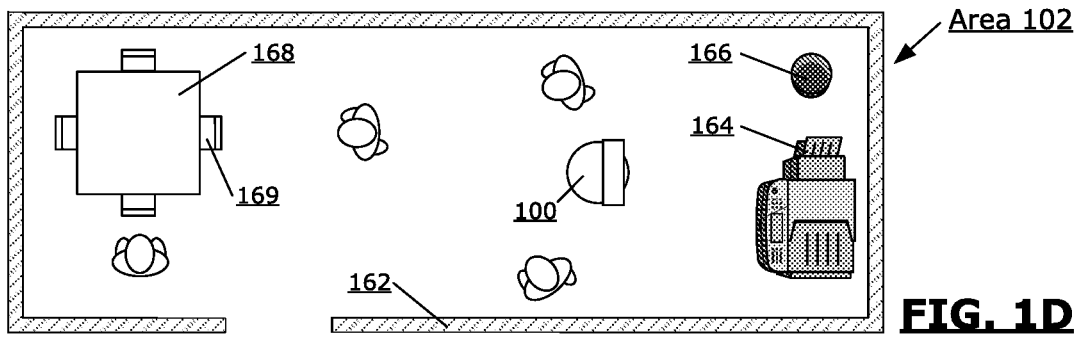

Examples provide for a robot that classifies objects according to predetermined classifications and excludes certain undesirable classifications of objects from becoming a map feature when the robot is building an occupancy map of a region. By excluding undesirable classifications of objects, the robot is able to develop a more accurate occupancy map that reflects the boundaries of the static and fixed objects which can reliably be expected to be present in the mapped region at any given moment.

In some examples, an example robot includes a set of sensors, a control system and propulsion mechanism. The control system may operate to obtain image data of a given region using the set of sensors, and to perform image analysis on the image data to detect a set of objects that are positioned in the given region. For each object of the set, the control system may classify each detected object of the set as being one of multiple predefined classifications of object permanency, including (i) a fixed classification, each object of the fixed classification being deemed to be persistently positioned, (ii) a static and unfixed classification, where each object of the static and unfixed classification is static and not persistently positioned (e.g., not likely to be moved, or capable of being moved by incidental contact by humans or other objects), and/or (iii) a dynamic classification, where each object of the dynamic classification is in movement or capable of being in movement. The robot may generate at least a first layer of an occupancy map for the given region, depicting each detected object of the set that is of the static and fixed classification, while excluding each detected object of the set that is either of the static and unfixed classification or of the dynamic classification.

In determining classifications, some examples include performing image analysis to identify an object by shape, feature or other characteristic, and assigning the object to a predefined class based on its similarity with respect to other one or more objects of the same class.

In variations, the object classification may provide for performing image analysis to classify objects into discrete categories or groups based on similarity. The groupings of objects may be used to define a class of objects for use in generating an occupancy map. Additionally, groupings of similar objects may be used to define any one of multiple classification schemas, which overtime can define classifications, along with a permanency characteristic that reflects whether the object is fixed or unfixed, as well as other more granular classifications.

With respect to examples described, some variations provide for the assignment of objects to classifications, categories or groups to be implemented as a probability. The object's classification may be based on a confidence score or value (e.g., value between 0.0 and 1.0) which can represent a confidence level as to the likelihood that the classification is correct. Thus, for example, the object's classification for an object that is classified as being fixed may reflect a confidence value as to whether the object may be moved in the future.

One or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1A illustrates an example robot for generating an occupancy map of a given region. In particular, FIG. 1A depicts a mobile robot 100 which may include a propulsion mechanism 140, a set of sensors 150 (e.g., laser sensor 152, camera sensor 154, etc.) and a control system 130. As described, the control system 130 can operate to acquire image data from a given region while the robot is occupancy map building. The robot 100 may perform occupancy map building by traversing the given region using the propulsion mechanism 140, while using the sensors 150 to capture image data of the given region from one or multiple perspectives. In some examples, the robot 100 may perform occupancy map building as a mode of operation. In variations, the robot 100 may perform occupancy map building to update a previously generated occupancy map.

The control system 130 can analyze image data obtained using sensors 150, to determine a permanency classification of each detected object. As described in more detail, the control system 130 may perform the image analysis when generating an occupancy map of a given region. The image analysis may be used to eliminate objects of a given classification from the map. As an addition or alternative, the map may be structured into multiple layers, where each layer depicts objects of the given region based on a type of permanency associated with the detected object.

The propulsion mechanism 140 includes an interface 142, at least one motor 144 and a steering system 146. The interface 142 connects the propulsion mechanism 140 to the control system 130 to enable the propulsion mechanism 140 to receive instructions from the control system 130. The propulsion mechanism 140 may receive instructions as to direction and velocity from the control system 130. The instructions may be used to drive the at least one motor 144 and direct the steering system 146. The at least one motor 144 can include one or multiple motors for propelling the robot. For example, one motor may drive all wheels of the robot 100, or, each wheel may be driven by its own motor, or any other combination of wheels and motors. The steering system 146 may include mechanical components (e.g., axels, linkages, hydraulics, belts, etc.) to manipulate an angle of the wheels (e.g., synchronous drive, articulated drive, etc.), or utilize a velocity difference between multiple motors (e.g., differential drive, etc.), or any combination thereof, to direct the robot 100 according to the instructions received from the control system 130.

The set of sensors 150 can include image sensors, such as a camera (e.g., two-dimensional color camera), a laser sensor (e.g., LiDAR sensor), or a pair of stereoscopic cameras. The control system 130 may use the set of sensors 150 to obtain image data. The control system 130 may perform image analysis on two-dimensional or three-dimensional images captured by the set of sensors 150.

The control system 130 includes a memory 110 and a processor 120. The memory 110 can be of any form (e.g., RAM, DRAM, etc.) and can include occupancy map generation logic 112. The occupancy map generation logic 112 can include instructions to control the robot 100 as it traverses through an area or region, and may also include instructions to generate an occupancy map of the areas or regions traversed by the robot 100. The map generation logic 112 may also include data (e.g., models, images, templates, etc.) to be referenced by the control system 130 during the map building process to assist in determining the classification of objects detected by the robot 100, as well as determining a predetermined category for each of the detected objects. The processor 120 may access the occupancy map generation logic 112 from the memory 110 to control the robot 100 and generate a map. In addition, as shown in FIG. 1A, the control system 130 may be integrated with the robot 100 (e.g., using hardware, firmware and/or software), or may be implemented using logic and/or processing resources which are remote from the robot 100.

FIGS. 1B and 1C illustrate an example robot 100 traversing a region 101 to generate an occupancy map. In FIG. 1B, the robot 100, utilizing the set of sensors 150, obtains image data of the region 101. In reference to FIG. 1B, the control system 130 performs image analysis of the image data captured from the region 101 to classify objects (e.g., wall 162, copier 164, waste basket 166) in the region 101 based on permanency. In the example provided, the control system 130 may provide a permanency classification for each of the detected objects. Undesirable objects may include dynamic objects or a predetermined category of undesirable objects. In the example of FIG. 1C, the control system may determine that the wall 162 and the copier 164 are of a fixed classification (e.g., a persistently-positioned object), while the waste basket 166 is static and unfixed. As such, according to the example of FIG. 1C, the control system 130 generates an occupancy map of the region 101 that includes the wall 162 and the copier 164, but excludes the waste basket 166.

Some variations provide for objects that are classified as being undesirable (e.g., dynamic or static and unfixed) to be included on an occupancy map as a layer, and/or through a visually distinguishable mechanism (e.g., objects which are dynamic are shown with greater transparency). In the example above, the control system 130 determines that the wall 162 and the copier 164 are fixed and therefore designated for inclusion in a "single-layer" occupancy map, while the control system 130 determines that the waste basket 166 is static and unfixed and therefore designated for exclusion from the occupancy map. However, rather than exclude the waste basket 166 from the occupancy map, the control system 130 may include the waste basket 166 as part of a "less permanent" layer along with the single layer occupancy map that includes the wall 162 and the copier 164. In such examples, the area surrounding the waste basket 166, as shown in FIG. 1B, may be delineated as inaccessible to aid in navigating and optimizing the route of the robot 100.

In addition, the predetermined categories may be customizable so that the number of predetermined categories, the identity of each of the predetermined categories, the determinations as to the detected objects that may be associated with each of the predetermined categories, etc., may vary from robot to robot or from location to location. In this way, the occupancy map can be tuned to a particular application of a user. FIG. 1D through FIG. 1G illustrate an example set of categories that may be utilized in determining a set of undesirable objects.

FIG. 1D illustrates an example "real world" layer or category for an area 102 that the robot 101 may be expected to map. The area 102 includes the robot 100, a wall 162, a copier 164, a waste basket 166, a table 168, a set of chairs 169 and multiple human actors.

Figure 1E:
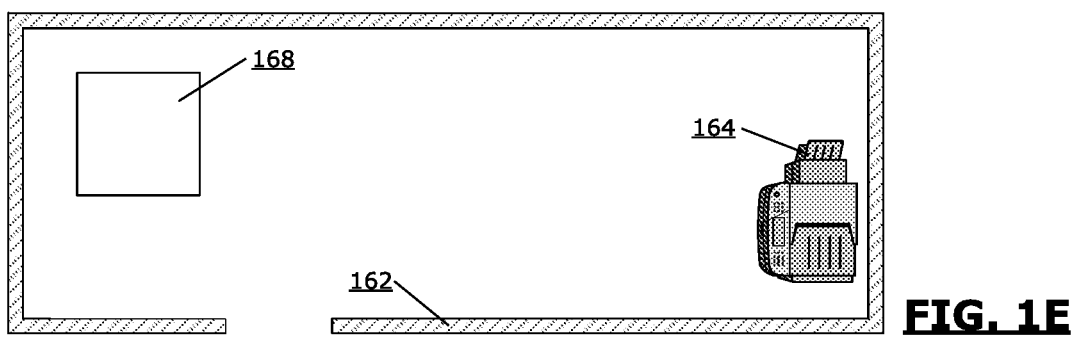

FIG. 1E illustrates an example layer or category for a set of persistently-positioned objects, which may include the wall 162, the copier 164 and the table 168. While each of the detected objects 162, 164, 168 may represent varying levels of permanence in their respective static states (e.g., the table 168 is more readily moved than the copier 164 or the wall 162), the detected objects may be grouped together under the same "persistently-positioned" category due to their low likeliness of being moved over an extended period of time.

Figure 1F:
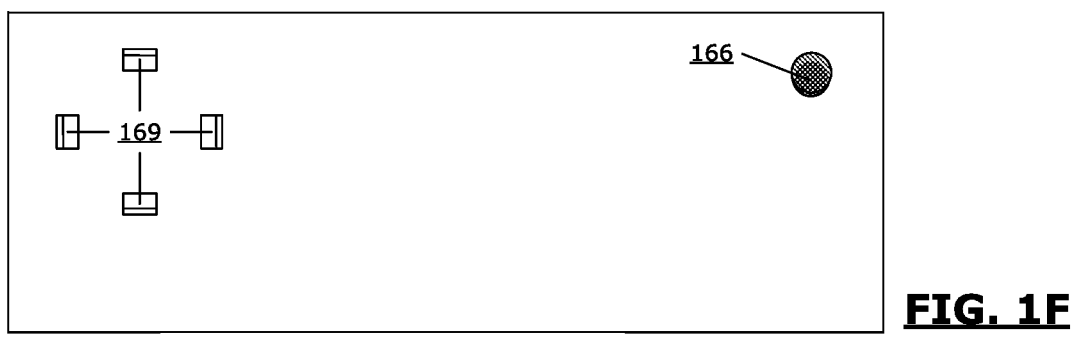
Figure 1G:
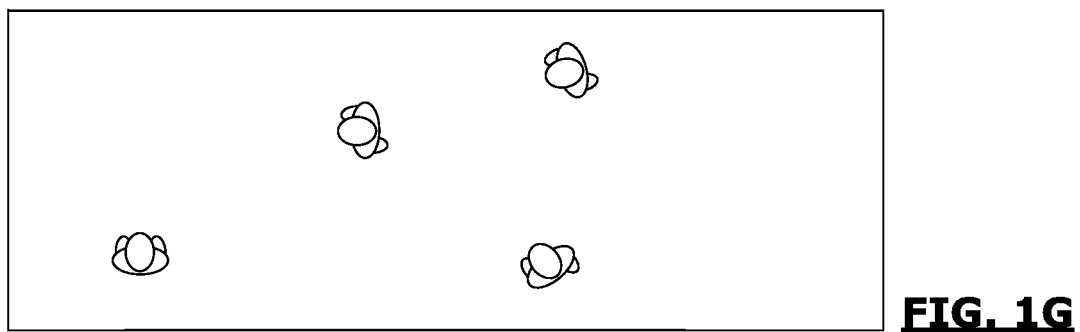

FIG. 1F illustrates an example layer or category for a set of inherently static objects, which may include the waste basket 166 and the set of chairs 169. The detected objects 166, 169, even though they may mostly maintain a static state (and may even have been static during a scan by the robot 100 to obtain image data), such objects may be classified as static and unfixed due to their high likeliness of being moved. FIG. 1G illustrates an example layer or category for a set of dynamic objects, such as human actors.

The control system 130 may utilize the categories discussed above in reference to the examples of FIG. 1D through FIG. 1G, or may utilize any other variation on the identity, quantity or groupings for such categories, when constructing a map. In addition, the control system 130 may include map generation logic 112 to provide that objects determined to be inherently static or dynamic may be included in a set of undesirable objects and may be excluded from the map.

Figure 2:
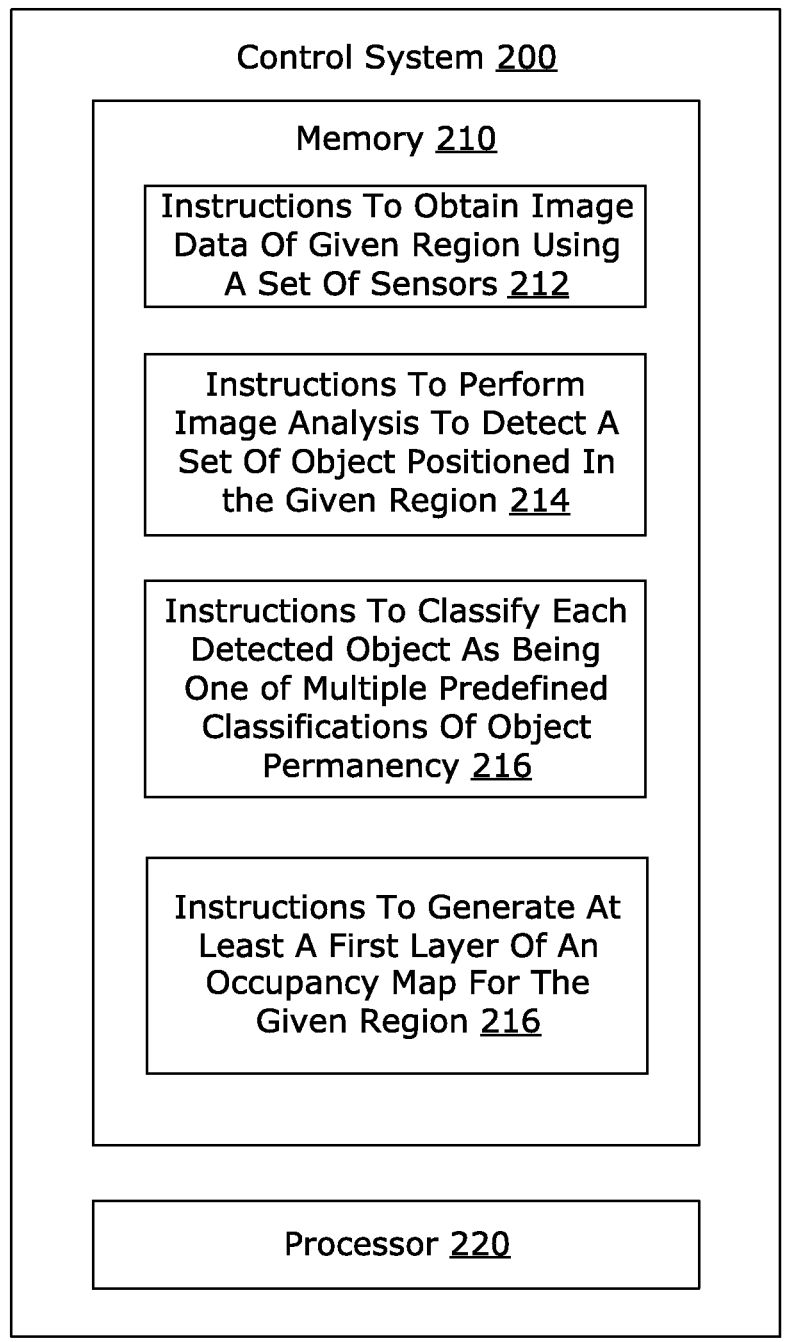
FIG. 2 illustrates an example control system for generating an occupancy map of a given region.

FIG. 2 illustrates an example control system for generating an occupancy map that can be utilized by a robot. As described with some examples, a control system 200 may be implemented to use sensor data generated from the sensor set of a robot, such as described with an example of FIG. 1A.

In FIG. 2, the control system 200 includes a memory 210 and a processor 220. The memory 210 can be of any form, including RAM, DRAM or ROM. The memory 210 can store instructions, such as through installation of software (e.g., an application). The processor 220 may access instructions from the memory 210 to control the robot 100. According to some examples, the processor 220 accesses multiple sets of instructions, including a first set of instructions 212 to obtain image data of a given region using a set of sensors. In an implementation, the control system 200 is onboard the robot 100, and obtains the image data from image sensors 150 and/or the memory of the robot 100. In variations, the control system 200 may be offboard from the robot 100, so as to obtain the imaged data from a communication link (e.g., wireless transmission).

The control system 200 may access a second set of instructions 214 to perform image analysis on the image data to detect a set of objects that are positioned in the given region. Additionally, the control system 200 may access a third set of instructions 216 to classify each detected object of the set as being one of multiple predefined classifications of object permanency. In examples, the multiple predefined classifications of object permanency may include (i) a fixed classification, where each object of the fixed classification being deemed to be persistently positioned; (ii) a static and unfixed classification, where each object of the static and unfixed classification being deemed to have a sufficient likelihood of being moved over a duration that includes separate instances of the robot traversing the given region; and/or (iii) a dynamic classification, where each object of the dynamic classification being in movement or being capable of movement.

Still further, the control system 200 may access a fourth set of instructions 218 to generate at least a first layer of an accompany map. The first layer may be generated to depict each detected object of the set that is of the static and fixed classification, while excluding each detected object of the set that is either of the static and unfixed classification or of the dynamic classification In some examples, the control system 200 can be implemented as an integral component of a working robot, such as for use with occupancy map building operations such robots routinely perform. For example, the control system 200 may execute the instructions 212-218 in real-time, as the robot traverses a given region to build the map. In variations, the control system 200 may be implemented as a remote or separate entity. For example, the control system 200 may receive sensor data that is transmitted from the robot 100 using, for example, a wireless communication and/or network channel. In such examples, the control system 200 may generate a three-dimensional map of the given region using the transmitted sensor data, and then communicate a generated map back to the robot once it is generated or updated.

In variations still, the control system 200 may communicate the generated occupancy map to a different robot than the one which was used to obtain sensor data of the given region. For example, the control system may generate a map for a given region using a first robot, and communicate the generated map to a second robot, or alternatively, to a fleet of robots. As another example, the control system 200 can be implemented on either the robot 100 or on a remote entity, to receive the sensor data for the given region from another robot, or alternatively, from a sensory device or assembly.

As described by some examples, the control system 200 may operate synchronously (e.g., in real-time) to build the map using sensor data that is being obtained from the sensor set of the robot. In variations, the instructions 212-218 may be implemented in part or entirety in an asynchronous manner. For example, in examples in which the control system is integrated with the robot 100, the robot 100 may execute instructions 212, 214, 216 and/or 219 at a later time, when, for example, the robot has more computing resources available to it, or when the robot is offline. Likewise, in an example in which the control system 200 is remote or separate, the control system 200 may execute the instructions 212-218 independently of the operations of the robot.

Figure 3A:
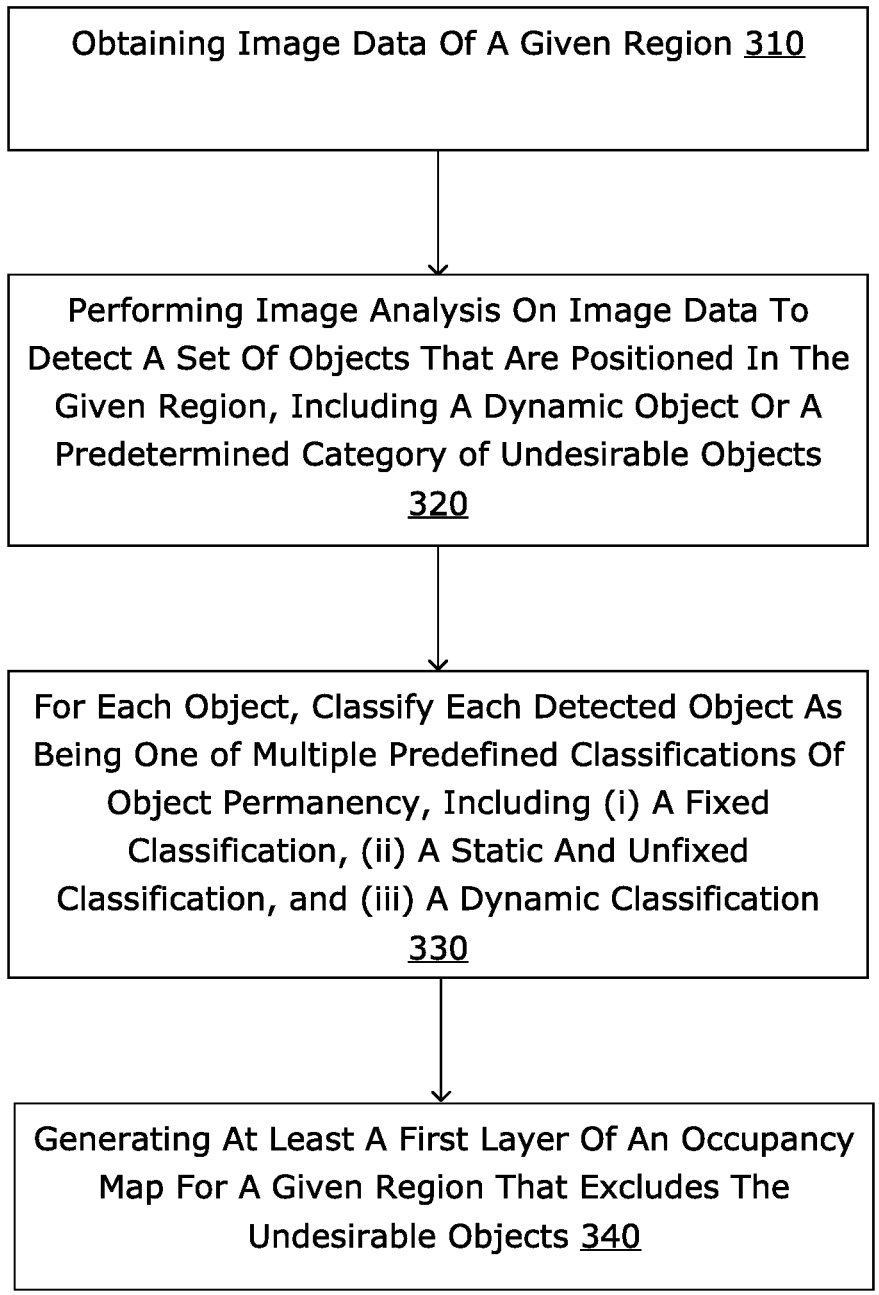
FIG. 3A illustrates an example method for generating an occupancy map of a given region.
Figure 3B:
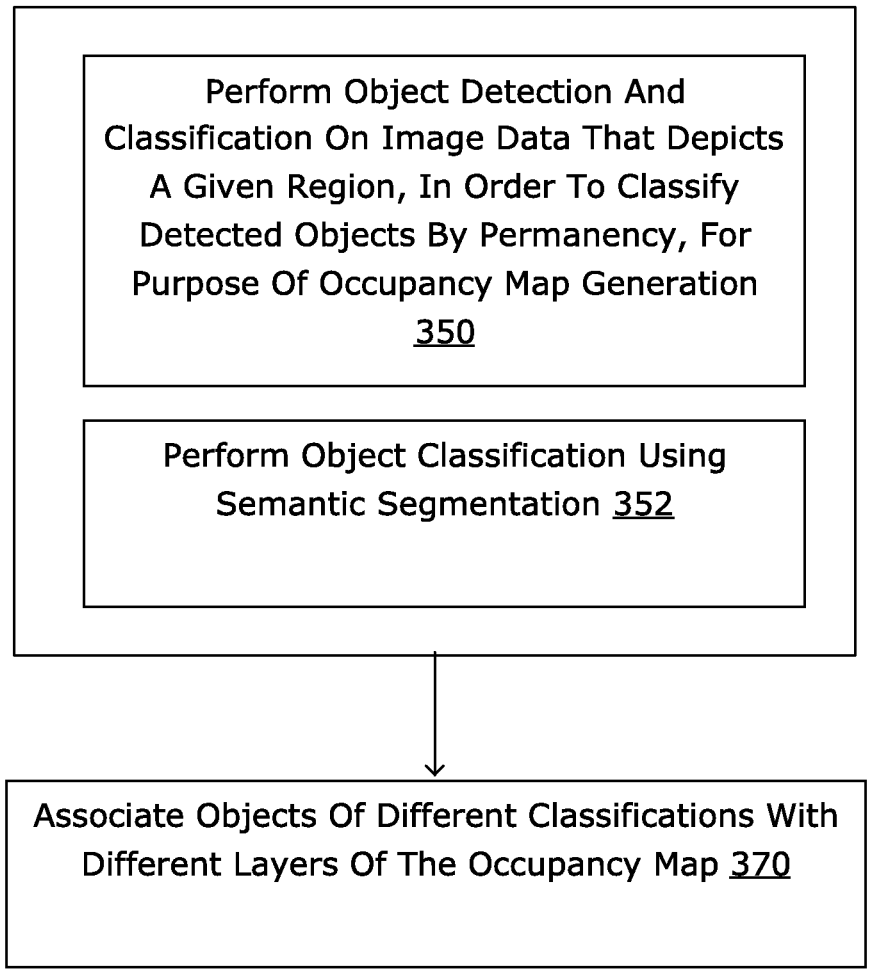
FIG. 3B illustrates an example method for classifying objects for use with an occupancy map.

FIG. 3A illustrates an example method for generating an occupancy map of a given region. FIG. 3B illustrates an example method for classifying objects for use with an occupancy map. Example methods as illustrated with FIG. 3A and FIG. 3B, may be implemented using components illustrated with examples of FIG. 1A and FIG. 2. Accordingly, references made to elements of FIG. 1A and FIG. 2 are for purposes of illustrating a suitable element or component for performing a step or sub-step being described.

With reference to an example of FIG. 3A, image data is obtained from multiple onboard sensors of a robot (310). The image data may be obtained from, for example, a camera and depth (or distance) sensor, a LiDAR camera, a pair of stereoscopic cameras and/or combination thereof (collectively "image sensors"). In some variations, the image data is obtained in real-time, as for example, a robot that traverses the given region with onboard image sensors (the "sensing robot"). In variations, the image data is obtained from memory, some time period after the robot traverses the given region.

In some examples, the image data is processed by control system 200, residing on the robot which obtains the image data. In variations, the image data is obtained by the control system 200, residing on another robot that is in local communication (e.g., local wireless link) with the sensing robot on which the image data is obtained. Still further, the control system which processes the image data may be a remote network computer, such as a server, in direct or indirect communication with the sensing robot.

Once the image data is obtained, image analysis may be performed to detect objects that are present in the scene, and to further determine a classification of the detected objects based on permanency and/or user-defined classification criteria (320). According to examples, the classifications of permanence may include one or more classifications, or sub-classifications, corresponding to each of (i) a fixed classification, where each object of the fixed classification is deemed to be static and persistently positioned, at least over a duration of time in which the robot can be expected to traverse the given region multiple times; (ii) a static and unfixed classification, where each object of the static and unfixed classification is deemed to not be persistently positioned; and/or (iii) a dynamic classification, where each object of the dynamic classification is either deemed to be in movement or inherently capable of movement. For purpose of occupancy map generation, the control system may seek to exclude objects that are of the static and unfixed classification, as well as objects of the dynamic classification (330). The classification determination may associate an object depicted in image data with a predetermined discrete classification corresponding to, for example, one of a fixed classification, a static and unfixed classification, a dynamic classification, or a user-defined classification. In variations, the classification determination may be based on a confidence score or value, reflecting, for example, a probability determination that the classification is correct.

In other variations, the classifications may not be predefined, but developed over time based on groupings of objects by similarity. Discrete groups of objects may represent an object class, which in turn may be associated with a permanency classification through observation (e.g., robot repeatedly recognizes object as being present in a given position) and/or training.

To identify objects of the dynamic classification, the control system 200 may compare image data of a captured scene over multiple, closely-spaced time intervals. If an object is detected as being present in one region of a captured scene in one time interval, and present in another region of the captured scene in another time interval, then the object may be identified as dynamic because it is in motion while the given region is being sensed.

While time-based object detection may be used to detect dynamic objects, some examples may also utilize image recognition and/or object detection analysis, in which a detected object is determined to be of a dynamic class or other classification based on detected characteristics of the object as depicted in a captured scene. In such cases, the detected object may be identified as being dynamic, even though the object is not in motion when the given region is being sensed. For example, a cat may lay still for a duration of time while a given region is being sensed, but the control system 200 may still recognize the cat for what it is, and identify it as a dynamic object.

In similar fashion, object classification may also be used to identify other objects that are static and unfixed. Such objects may have a characteristic of being inherently static, but not persistently-positioned (e.g., static and in the same location over an extended duration of time). An object may be deemed to not be persistently-positioned if the document is deemed to be movable by, for example, incidental contact or other objects. For example, a desk chair in a room may be static, but likely to move over time. A large table, on the other hand, can be assumed as being static and persistently-positioned within in the same room. The control system 200 may perform analysis on image data depicting such objects, to identify physical characteristics (e.g., shape, signature features, etc.) that are characteristic of an object type or category. Based on the determined object shape, markings or other visual characteristic, the determination may be made by the control system 200 to identify the object as being static and unfixed.

The control system 200 may generate at least a first layer of an occupancy map for a given region that excludes the undesirable objects, and specifically objects that are designated as being dynamic or of an object type that is static but not persistently-positioned (340). The generation of the three-dimensional map for a given region may encompass an initial mapping process or activity, as well as subsequent activities that may result in the map of the given region being updated. In particular, examples recognize that map updates can be made when the robot senses a given region for any task or activity, and encounters an object that is unknown, or otherwise unexpected as to its location.

In performing the image analysis, the control system 200 may utilize a library of models, ground truth data, and/or templates, identifying types, categories and subcategories of objects. The library of models, ground truth data and/or templates may also be updated with repeated uses of the robot within a given region. According to some examples, the library that is maintained for purpose of image analysis can be updated with objects that the robot 100 encounters over time, within a given region. Additionally, the robot 100 may utilize the image library when the robot is operating in a given region for purposes other than map building (e.g., sweeping, vacuuming, delivering a package, etc.). In particular, the control system 200 may maintain a library of objects that are classified by permanency and/or user-defined criterion, and when the robot traverses a given region and encounters an unexpected object, the control system 200 may perform image analysis to compare the object with a collection of objects that have previously been encountered and classified by the robot. To perform such comparison, the control system 200 may perform object classification and/or recognition (e.g., detect signature feature of object, and compare signature feature to signature features of other objects encountered in the given region over time). If the control system 200 does not recognize an unexpected object as being an object that it has previously recognized, the control system 200 may reclassify the object by type (e.g., a table or chair), and make a further determination as to whether the object is undesirable based on the determination of object type. Thus, examples recognize that the control system 200 for the robot 100 may update a three-dimensional map of a given region at any time when the robot 100 is deployed, to identify newly encountered objects and to identify when such objects are dynamic, not persistently positioned or otherwise undesirable for use in an occupancy map.

Additionally, in some examples, the control system 200 may update the models, ground truth data and template images that are used to classify objects (e.g., by permanency). For example, if a robot repeatedly encounters an object that is designated as being dynamic or static and unfixed, but subsequently detects the object as being static in its position over an extended duration of time, then the control system 200 may reclassify the object as being fixed. The re-designation of the object may coincide with the control system 200 reclassifying the encountered object to be of a different object type than a previous object type classification, where the reclassified object type is known to be static and persistently-positioned. By way of example, a robot may initially map a room and identify a table as being undesirable, based on the size of the table and/or its legs (e.g., card table). However, if the robot repeatedly encounters the table legs in the same position over an extended period of time, then the control system 200 may reclassify the object as being of a type that is static and persistently-positioned (e.g., table fixture). In such cases, the control system 200 may update the map of the given region to include the table.

Conversely, if the robot identifies a particular object as being of a type that is static and persistently-positioned (e.g., a table), such that the object is included in the map, but subsequently detects the object as having been moved, then the control system 200 may reclassify the object as being of a type that is undesirable, so that it is excluded from the map. Alternatively, the control system 200 may designate the object type of the displaced object as being undesirable, such that if the robot encounters other objects of similar appearance, those objects will also be designated as undesirable, and excluded from the map of the given region.

With reference to FIG. 3B, the control system 200 may perform object detection and classification on image data that depicts a given region, in order to classify detected objects by permanency, for purpose of occupancy map generation (350). In addition, while some examples provide for classifying objects by permanency, in variations, objects may be classified by other type, including by user-defined classification criterion. For example, a user may define a classification of an object by a given shape (e.g., circular objects). In performing object classification, the control system 200 may use a semantic segmentation process or technique (352). In such process, a pixel by pixel analysis is performed to segment a detected object depicted within an image into the foreground. Once segmented, the control system 200 may identify a shape or perimeter feature of the segmented object. The control system 200 may then compare the detected shape or perimeter feature to a library of models and templates in order to identify a matching object type.

As described with some examples, the library of models and templates may be based in part on historical data, corresponding to images that have previously been processed and classified by permanency. The classification by permanency may include, for example, designating individual objects as being fixed, static and unfixed, or dynamic. For purpose of generating the occupancy map for enabling subsequent control of robot movement, the occupancy map may include at least one layer which excludes detected objects, other than detected objects that are fixed. For example, the occupancy map may exclude objects that are classified as being static and unfixed or dynamic.

In some examples, the control system 200 may determine a classification of a newly detected object by comparing the segmented object to templates or model images of previously encountered objects. If a newly encountered object is deemed to sufficiently match in appearance to a previously classified object, then the classification of the prior object may be designated for the newly encountered object. Over time, the control system 200 may reclassify objects, based on what the robot senses in a given region.

In some variations, a confidence score is associated with the matched object classification, and when multiple object classifications are possible, the confidence score may be utilized to select the best suited object type. For purpose of occupancy map generation, an object may be classified by permanency and/or by user-defined classification, if the image analysis determines that a shape or other visual characteristic of the object is sufficiently similar to models or template objects of the particular classification, at least to a threshold level of confidence with respect to the detected classification.

The control system 200 may also associate objects of different classifications with different layers of the occupancy map (370). For example, when objects are classified by permanency, different object permanency classifications may be associated with different layers of the occupancy map. Furthermore, the occupancy map may activate different layers so that the occupancy map depicts only the selected layer, corresponding to objects of a given classification (e.g., objects of a corresponding permanency classification or by user-defined classification).

Figure 4:
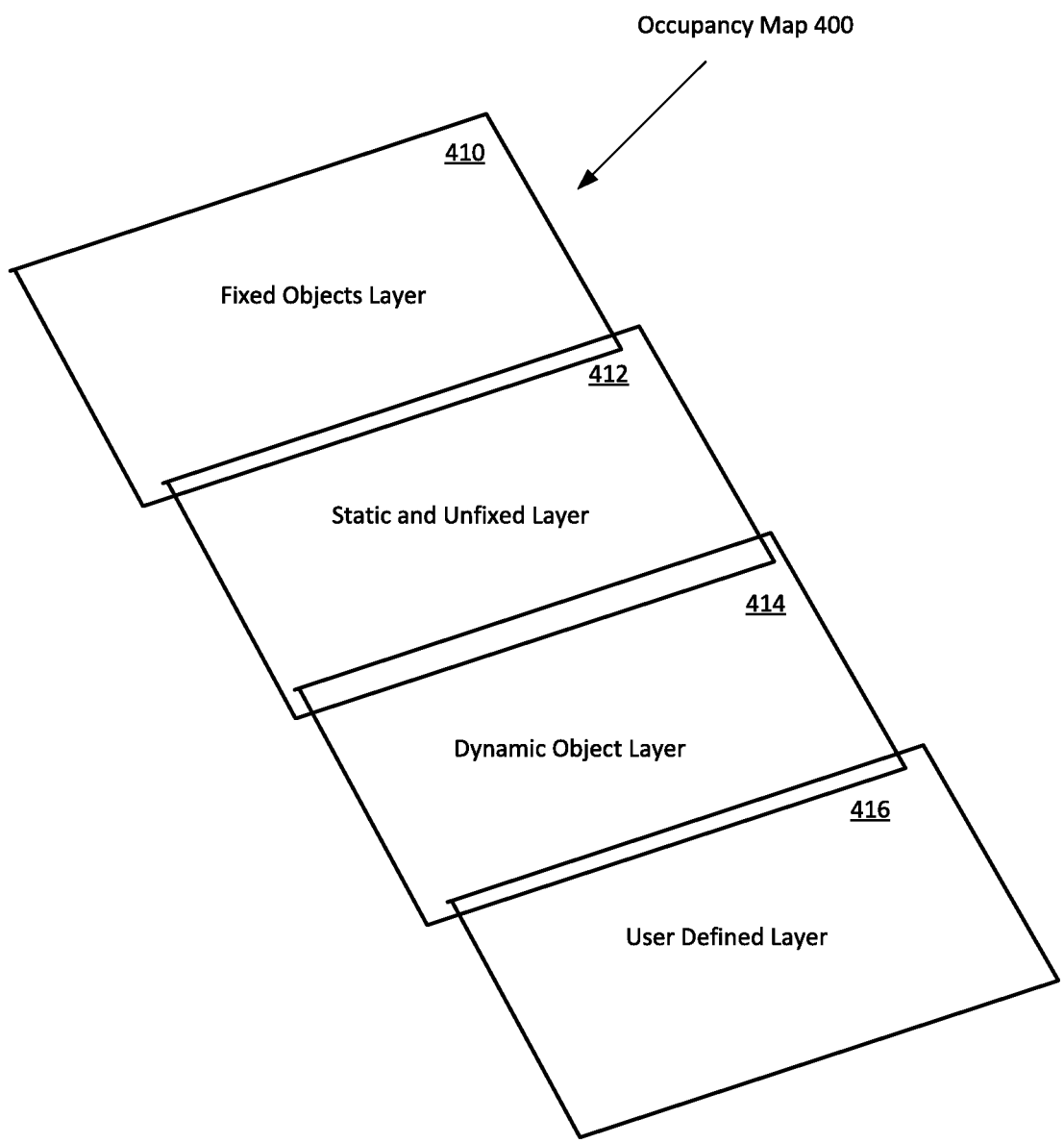
FIG. 4 illustrates an example occupancy map.

FIG. 4 illustrates an example occupancy map, in accordance with examples as described. An occupancy map 400 may be generated by, for example, the robot 100 and/or the control system 200. The occupancy map 400 may be multi-layered, with each layer depicting objects of a given region that are of a particular classification or sub-classification. As described with other examples, an image recognition process may detect a set of objects from a given region, and then classify the detected objects in accordance with the detected object's permanence classification. For example, the permanence classification may include a fixed classification, for objects which are recognized from image data to be of a type that have the most permanence (e.g., objects which are not moved or cannot be readily moved). The permanence classification may include a dynamic classification, representing objects which are moving or objects which are inherently capable of moving, and thus not having any permanence. Still further, the permanence classification may include a static and unfixed classification, representing objects which are inherently static, but prone (e.g., as a result of size or weight) to be moved by other objects.

With respect to examples, the object classification may be performed using image analysis. For example, semantic segmentation may be used to detect an object type by shape, outline, or shape features. The object may be compared to templates or models of other images, and similarity comparisons may be performed to identify the object type (e.g., chair, table, waste basket). Based on the object type, the permanence classification can be made.

Still further, some examples provide for user-defined or customized classifications. The customized classifications may be made by shapes or outlines which, for example, a user predefines as being of a separate classification and/or layer.

In some examples, the occupancy map 400 includes one or more layers for each type of permanence classification, as well as user-defined or customized classifications. Thus, for example, the occupancy map 400 includes a fixed object layer 410, to depict objects of the given region which are deemed to be fixed, apart from dynamic or static and unfixed objects. Likewise, the occupancy map 400 may include a static and unfixed object layer 412, to depict static and unfixed objects of the given region apart from dynamic objects and fixed objects. The occupancy map 400 may also include a dynamic object layer 414, apart from the fixed objects, and the static and unfixed objects. Each layer may depict a corresponding class of objects to enable objects of the particular class to be comparatively analyzed without clutter from objects of other classes.

According to examples, the control system 200 may, for example, select individual layers, so that objects of other layers are removed from the particular layer that is selected. When an object is removed from a layer, the control system 200 may implement one or more processes to depict the portion of the given region without the object that had been removed. The removed object may, for example, be replaced by a void, or a re-pixilation in which the portion of the image corresponding to the removed object is copied from a surrounding pixel area, or from an extrapolation to a surrounding region of the removed object.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A robot comprising:
a set of sensors to capture image data;
a control system;
a propulsion mechanism;
wherein the control system:
obtains image data of a given region using the set of sensors;
performs image analysis on the image data to detect a set of objects that are positioned in the given region, and for each object of the set;

classifies each detected object of the set as being one of multiple predefined classifications of object permanency, the multiple predefined classifications of object permanency including (i) a fixed classification, each object of the fixed classification being deemed to be persistently positioned, (ii) a static and unfixed classification, each object of the static and unfixed classification being deemed to have a sufficient likelihood of being moved over a duration that includes separate instances of the robot traversing the given region, and/or (iii) a dynamic classification, each object of the dynamic classification being in movement or being capable of movement; and generates an occupancy map for the given region, the occupancy map comprising:

a first layer depicting each detected object of the set in the given region that is of the static and fixed classification and excluding each detected object of the set that is either of the static and unfixed classification or of the dynamic classification;

a second layer that includes each detected object of the set in the given region that is of the static and unfixed classification; and a third layer that includes each detected object of the set in the given region that is of the dynamic classification.

2. The robot of claim 1, wherein the control system performs semantic segmentation to classify each object as being one of multiple predefined classifications of object permanency.

3. The robot of claim 1, wherein the set of sensors includes a laser sensor, and wherein the control system obtains image data of the given region using the laser sensor.

4. The robot of claim 1, wherein the set of sensors includes a camera, and wherein the control system obtains image data of the given region using the camera.

5. The robot of claim 1, wherein the control system generates each of the first layer, the second layer and third layer of the occupancy map to be three-dimensional.

6. The robot of claim 1, wherein the control system includes one or more processors onboard the robot.

7. The robot of claim 1, wherein the control system further classifies at least a first detected object of the set as being one of a user-defined classification.

8. The robot of claim 7, wherein the control system uses semantic segmentation to classify the first detected object of the set as being of the user-defined classification.

9. The robot of claim 7, wherein the control system generates at least an additional layer of the occupancy map that depicts each detected object of the set that is of the user-defined classification.

10. A control system comprising:
a memory to store instructions; and
at least one processor to execute the instructions to:
obtain image data of a given region using a set of sensors;
perform image analysis on the image data to detect a set of objects that are positioned in the given region, and for each object of the set;
classify each detected object of the set as being one of multiple predefined classifications of object permanency, the multiple predefined classifications of object permanency including (i) a fixed classification, each object of the fixed classification being deemed to be persistently positioned, (ii) a static and unfixed classification, each object of the static and unfixed classification being deemed to have a sufficient likelihood of being moved over a duration; and/or (iii) a dynamic classification, each object of the dynamic classification being in movement or being capable of movement; and generate an occupancy map for the given region, the occupancy map comprising:

a first layer depicting each detected object of the set in the given region that is of the static and fixed classification and excluding each detected object of the set that is either of the static and unfixed classification or of the dynamic classification;

a second layer that includes each detected object of the set in the given region that is of the static unfixed classification; and a third layer that includes each detected object of the set in the given region that is of the dynamic classification.

11. A method for mapping a given region, the method being implemented by at least one processor and comprising:

obtaining image data of a given region using the set of sensors;

performing image analysis on the image data to detect a set of objects that are positioned in the given region, and for each object of the set;

classifying each detected object of the set as being one of multiple predefined classifications of object permanency, the multiple predefined classifications of object permanency including (i) a fixed classification, each object of the fixed classification being deemed to be persistently positioned, (ii) a static and unfixed classification, each object of the static and unfixed classification being deemed to have a sufficient likelihood of being moved over a duration, and/or (iii) a dynamic classification, each object of the dynamic classification being in movement or being capable of movement; and generating an occupancy map for the given region, the occupancy map comprising:

a first layer depicting each detected object of the set in the given region that is of the static and fixed classification and excluding each detected object of the set that is either of the static and unfixed classification or of the dynamic classification;

a second layer that includes each detected object of the set in the given region that is of the static and unfixed classification; and a third layer that includes each detected object of the set in the given region that is of the dynamic classification.

* * * * *